US010871960B2

(12) United States Patent
Bashi et al.

(10) Patent No.: US 10,871,960 B2
(45) Date of Patent: Dec. 22, 2020

(54) UPGRADING A STORAGE CONTROLLER OPERATING SYSTEM WITHOUT REBOOTING A STORAGE SYSTEM

(71) Applicant: EMC IP Holding Company LLC, Hopkinton, MA (US)

(72) Inventors: Erez Bashi, Kibbutz Na-An (IL); Alexander Shraifel, Maalot (IL); Alex Kulakovsky, Jerusalem (IL); Sally Golan, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 16/391,524

(22) Filed: Apr. 23, 2019

(65) Prior Publication Data

US 2020/0341749 A1 Oct. 29, 2020

(51) Int. Cl.
*G06F 8/654* (2018.01)
*G06F 3/06* (2006.01)

(52) U.S. Cl.
CPC ............ *G06F 8/654* (2018.02); *G06F 3/0607* (2013.01); *G06F 3/0632* (2013.01); *G06F 3/0673* (2013.01)

(58) Field of Classification Search
CPC ...... G06F 3/0673; G06F 8/654; G06F 3/0632; G06F 3/0607
See application file for complete search history.

(56) References Cited

U.S. PATENT DOCUMENTS

| 7,000,229 B2 | 2/2006 | Gere |
| 7,251,812 B1 * | 7/2007 | Jhanwar ................... G06F 8/65 713/100 |
| 7,356,679 B1 * | 4/2008 | Le ...................... G06F 9/45558 713/1 |
| 7,444,464 B2 | 10/2008 | Urmston et al. |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Wei Y Zhen
*Assistant Examiner* — Amir Soltanzadeh
(74) *Attorney, Agent, or Firm* — Ryan, Mason & Lewis, LLP

(57) ABSTRACT

An apparatus in one embodiment is configured to extract a set of components utilized in a first version of a storage controller operating system (OS) to a designated partition of a storage system on which the first version of the storage controller OS is to be installed, and to identify changes to be applied for installing the first version of the storage controller OS by comparing content of the extracted set of components utilized in the first version of the storage controller OS with content of components utilized in a second version of the storage controller OS that is currently installed. The (Continued)

apparatus is also configured to apply, utilizing at least one rule corresponding to at least one component utilized in the first version of the storage controller OS, at least one of the identified changes to upgrade to the first version of the storage controller OS.

20 Claims, 6 Drawing Sheets

(56) References Cited

U.S. PATENT DOCUMENTS

| | | | |
|---|---|---|---|
| 7,818,736 | B2 | 10/2010 | Appavoo et al. |
| 8,095,726 | B1 | 1/2012 | O'Connell et al. |
| 8,214,612 | B1 | 7/2012 | Natanzon |
| 8,769,522 | B2 | 7/2014 | Venkatraman et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 2004/0117414 | A1 | 6/2004 | Braun et al. |
| 2007/0061372 | A1* | 3/2007 | Appavoo ............... G06F 8/656 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2011/0113413 | A1* | 5/2011 | Ewington ............... G06F 8/63 717/168 |
| 2012/0254852 | A1* | 10/2012 | Emaru ................... G06F 8/60 717/173 |
| 2013/0325824 | A1 | 12/2013 | Shoens |
| 2014/0173579 | A1* | 6/2014 | McDonald ............... G06F 8/65 717/170 |
| 2014/0181016 | A1 | 6/2014 | Whitehead et al. |
| 2015/0178071 | A1* | 6/2015 | Pavlik ............... G06F 9/45554 717/168 |
| 2016/0092203 | A1* | 3/2016 | Filali-Adib ............ G06F 8/656 717/171 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2017/0255459 | A1* | 9/2017 | Tanimoto ............ G06F 12/0246 |
| 2018/0060057 | A1* | 3/2018 | Dake ..................... G06F 8/65 |
| 2020/0089573 | A1* | 3/2020 | Baggerman ........... G06F 16/128 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

UPGRADING A STORAGE CONTROLLER OPERATING SYSTEM WITHOUT REBOOTING A STORAGE SYSTEM

FIELD

The field relates generally to information processing systems, and more particularly to storage in information processing systems.

BACKGROUND

Storage systems are utilized in many information processing systems. A storage system typically includes one or more storage controllers on which an operating system is installed to provide various functionality in the storage system. Such functionality may include, for example, front-end connectivity to clients or host devices providing input-output requests, back-end connectivity to storage devices where data is stored, etc. Difficulties may arise when attempting to upgrade the operating system of such storage controllers while a storage system is in use.

SUMMARY

Illustrative embodiments provide techniques for upgrading the operating system of a storage controller of a storage system. Such techniques enable upgrading the operating system of the storage controller without requiring a reboot of the storage system, thereby improving the performance of the storage system, including in cases where the storage system is part of a clustered storage system.

In one embodiment, an apparatus comprises at least one processing device comprising a processor coupled to a memory. The processing device is configured to extract a set of components utilized in a first version of a storage controller operating system to a designated partition of one of a plurality of storage devices of a given storage system on which the first version of the storage controller operating system is to be installed. The processing device is also configured to identify one or more changes to be applied for installing the first version of the storage controller operating system on the given storage system by comparing content of the extracted set of components utilized in the first version of the storage controller operating system with content of components utilized in a second version of the storage controller operating system currently installed on the given storage system. The processing device is further configured to apply, utilizing at least one rule corresponding to a given one of the components utilized in the first version of the storage controller operating system, at least a given one of the identified changes to upgrade the second version of the storage controller operating system to the first version of the storage controller operating system.

These and other illustrative embodiments include, without limitation, apparatus, systems, methods and processor-readable storage media.

DETAILED DESCRIPTION

Figure 1:
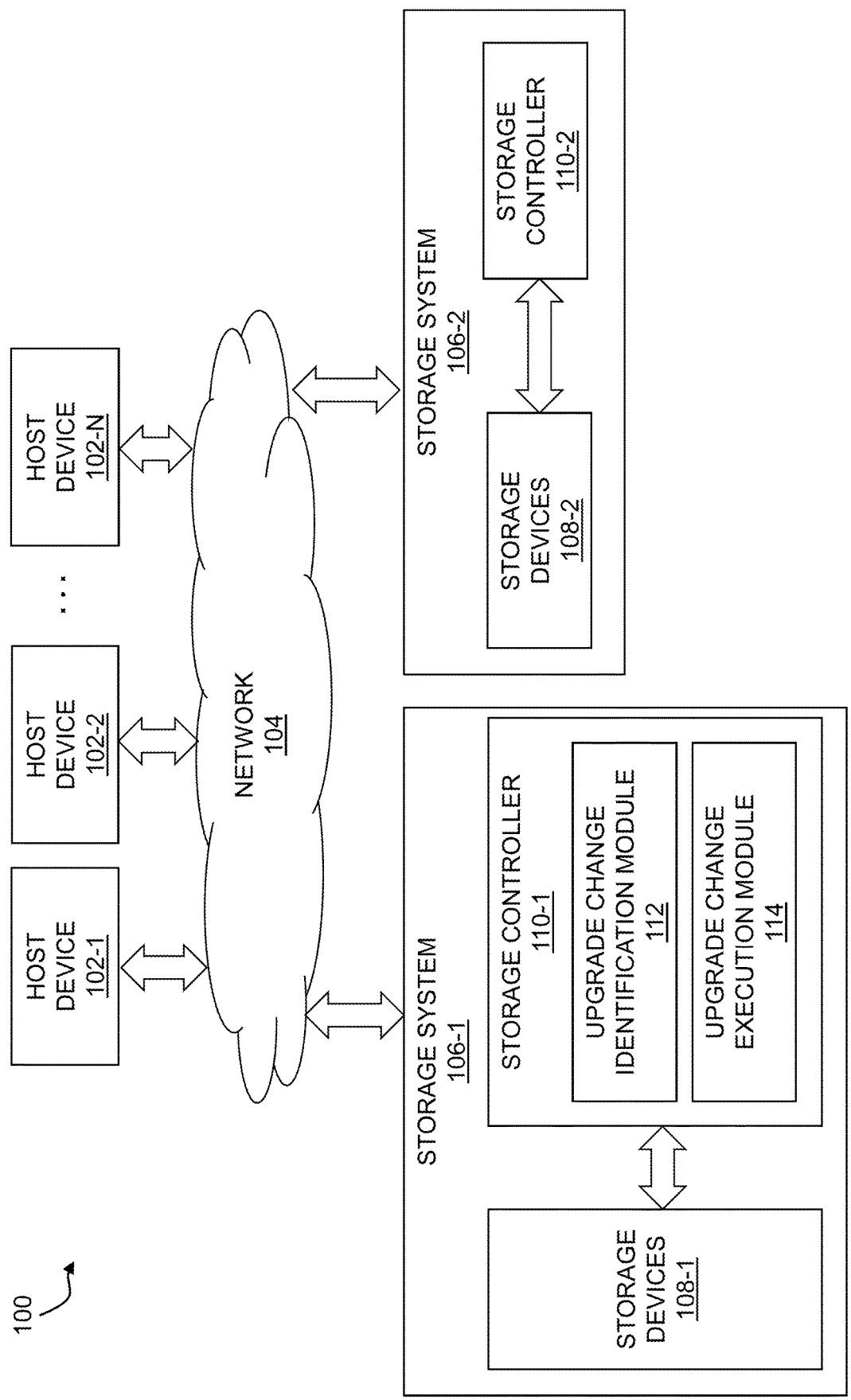
FIG. 1 is a block diagram of an information processing system comprising a clustered storage system configured with functionality for fast storage controller operating system upgrades in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

A storage system typically includes a storage controller having an operating system (OS) installed thereon. When the storage controller OS needs to be upgraded, the storage controller is rebooted which can lead to degraded performance. It should be appreciated that in this context the term "upgrade" refers to replacing an existing version of the storage controller OS with a different version of the storage controller OS. The different version may be newer or updated relative to the existing version of the storage controller OS. In some cases, the different version may be a previous or older version of the storage controller OS, where upgrading the storage controller OS includes roll-back to the previous or older version of the storage controller OS.

In a clustered storage system that includes two or more storage systems, also referred to herein as storage servers or nodes, each node may be down for approximately 15 minutes while it is rebooted to complete an upgrade of the storage controller OS. As the number of nodes in the clustered storage system increases, the length of time in which the clustered storage system experiences degraded performance due to such reboots increases. Further, even after a node is back up after a reboot, it may take some time (e.g., 10 minutes or longer) to load proactive metadata or other required information until the node is stable and can act normally within the clustered storage system.

Consider, for example, a clustered storage system with multiple nodes. To upgrade the storage controller OS on each of the nodes of the clustered storage system, some embodiments may sequentially reboot each node. While a first node is being rebooted, a second node (e.g., an adjacent node) in the clustered storage system must serve IO requests that would normally be processed by the first node being rebooted, in addition to IO requests that are normally processed by the second node. Thus, the second node will experience degraded performance that impacts the clustered storage system as a whole. With a large number of nodes in the clustered storage system, the amount of time in which performance is degraded may be significant. This is true even for relatively "minor" changes or upgrades to the storage controller OS, as the time required for reboot may be the same regardless of the extent of the change or significance of the upgrade to the storage controller OS.

Illustrative embodiments provide techniques for reducing or eliminating an amount of time that a clustered storage system is in a degraded performance mode due to upgrade of the storage controller OS by reducing or eliminating reboot of nodes in the clustered storage system.

FIG. 1 shows an information processing system 100 configured in accordance with an illustrative embodiment. The information processing system 100 comprises a plurality of host devices 102-1, 102-2, . . . 102-N (collectively, host devices 102) which communicate over a network 104 with storage systems 106-1 and 106-2 (collectively, storage systems 106). Although FIG. 1 shows an arrangement in which there are two storage systems 106, it should be appreciated that more or fewer than two storage systems 106 may be utilized. In the FIG. 1 embodiment, the storage systems 106 are assumed to be part of a clustered storage system as described above and in further detail below.

The host devices 102 illustratively comprise servers or other types of computers of an enterprise computer system, cloud-based computer system or other arrangement of multiple compute nodes associated with respective users.

The host devices 102 in some embodiments illustratively provide compute services such as execution of one or more applications on behalf of each of one or more users associated with respective ones of the host devices. Such applications illustratively generate input-output (TO) operations that are processed by the storage system 106. The term "input-output" as used herein refers to at least one of input and output. For example, IO operations may comprise write requests and/or read requests directed to stored data of the storage systems 106.

The storage systems 106 illustratively comprise respective processing devices of one or more processing platforms. For example, the storage systems 106 can each comprise one or more processing devices each having a processor and a memory, possibly implementing virtual machines and/or containers, although numerous other configurations are possible.

The storage systems 106 can additionally or alternatively be part of cloud infrastructure such as an Amazon Web Services (AWS) system. Other examples of cloud-based systems that can be used to provide at least portions of the storage systems 105 include Virtustream Enterprise Cloud, Virtustream Storage Cloud, Google Cloud Platform (GCP) and Microsoft Azure.

The storage systems 106 may be implemented on a common processing platform, or on separate processing platforms.

The host devices 102 are illustratively configured to write data to and read data from the storage systems 106 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 106-1 comprises a plurality of storage devices 108-1 and an associated storage controller 110-1. The storage system 106-2 similarly comprises a plurality of storage devices 108-2 and an associated storage controller 110-2. The storage devices 108-1 and 108-2 (collectively, storage devices 108) store various storage volumes, which may comprise respective logical units (LUNs) or other types of logical storage volumes.

The storage devices 108 illustratively comprise solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 106 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems 106 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 106 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, communications between the host devices 102 and the storage systems 106 comprise Small Computer System Interface (SCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

The storage controller 110-1 of the storage system 106-1 includes an upgrade change identification module 112 and an upgrade change execution module 114. Although not shown in FIG. 1, it is assumed that the storage controller 110-2 of storage system 106-2 similarly includes an upgrade change identification module and an upgrade change execution module.

The upgrade change identification module 112 is configured to analyze a first or upgraded version of a storage controller OS to determine a set of components utilized in the first version of the storage controller OS. The components may include packages (e.g., rpm or deb packages utilized in a Linux OS), configuration files, other types of files and applications, etc. As used herein, OS components are used to refer to components that are utilized by an OS. The upgrade change identification module 112 is also configured to generate one or more rules for handling changes to respective ones of at least a subset of the set of components utilized in the first version of the storage controller OS. The generated rules, in some embodiments, are included in a file that is made part of an image of the first version of the storage controller OS.

The upgrade change execution module 114 is configured to extract the set of components utilized in the first version of the storage controller OS to a designated partition of one of the storage devices 108-1 of the storage system 106-1 on which the first version of the storage controller OS is to be installed. The upgrade change execution module 114 is also configured to identify one or more changes to be applied for installing the first version of the storage controller OS on the storage system 106-1 by comparing content of the extracted set of components utilized in the first version of the storage controller OS with content of components utilized in a second or existing version of the storage controller OS currently installed on the storage system 106-1. The upgrade change execution module 114 is further configured to apply, utilizing a given one of the generated rules corresponding to a given one of the components utilized in the first version of the storage controller OS, at least a given one of the identified changes to upgrade the second version of the storage controller OS to the first version of the storage controller OS without rebooting the storage system 106-1.

The upgrade change identification module 112 and upgrade change execution module 114 may be implemented using a dedicated processor of the storage system 106-1 that is distinct from additional processors that are responsible for handling IO processing by the storage system 106-1. In this way, upgrading the storage controller OS will minimize impact on the functioning of the storage system 106-1. When the storage system 106-1 is part of a clustered storage system (e.g., with storage system 106-2), the dedicated processor used for implementing the upgrade change identification module 112 and upgrade change execution module 114 may be further distinct from additional processors that are responsible for cluster management processing by the storage system 106-1.

The storage controllers 110-1 and 110-2 (collectively, storage controllers 110) of the storage systems 106 should also be understood to include additional modules and other components typically found in conventional implementations of storage controllers and storage systems, although such additional modules and other components are omitted from the figure for clarity and simplicity of illustration.

The storage systems 106 in the FIG. 1 embodiment are assumed to be implemented using at least one processing platform each comprising one or more processing devices each having a processor coupled to a memory. Such processing devices can illustratively include particular arrangements of compute, storage and network resources.

The storage systems 106 may be implemented on respective distinct processing platforms, although numerous other arrangements are possible. At least portions of the host devices 102 may be implemented on the same processing platforms as the storage systems 106 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 106 to reside in different data centers. Numerous other distributed implementations of the storage systems 106 and host devices 102 are possible.

Additional examples of processing platforms utilized to implement storage systems and host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, storage systems 106, storage devices 108, and storage controllers 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for upgrading a storage controller OS can be implemented in one or more of the host devices 102, or partially in one or more of the host devices 102 and partially in one or more of the storage systems 106. Accordingly, illustrative embodiments are not limited to arrangements in which all such functionality is implemented in the storage systems 106 or the host devices 102, and therefore encompass various hybrid arrangements in which the functionality is distributed over one or more storage systems and one or more host devices, each comprising one or more processing devices.

The operation of the information processing system 100 will now be described in further detail with reference to the flow diagram of the illustrative embodiment of FIG. 2. The process as shown includes steps 200 through 208, and is suitable for use in system 100 but is more generally applicable to other types of information processing systems in which a storage controller of a storage system is to be upgraded, including in situations where the storage system is part of a clustered storage system with multiple storage controllers or a distributed storage controller arrangement. The steps are illustratively performed at least in part under the control of the upgrade change identification module 112 and the upgrade change execution module 114.

Figure 2:
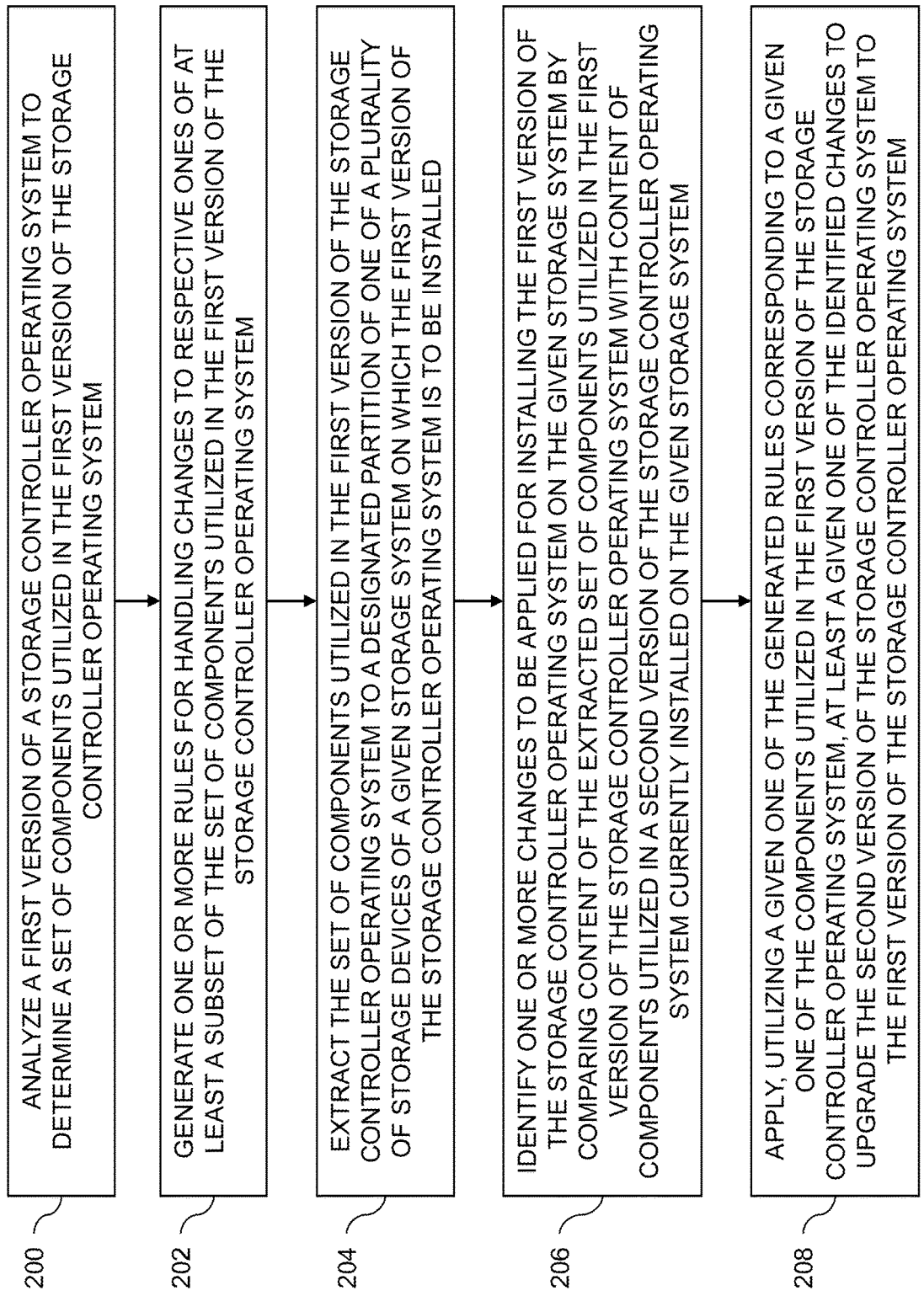
FIG. 2 is a flow diagram of a process for upgrading the operating system of storage controllers in a clustered storage system in an illustrative embodiment.

The FIG. 2 process begins with step 200, analyzing a first version of a storage controller OS to determine a set of components utilized in the first version of the storage controller OS. The first version is assumed to be one that is to be installed on a given storage system, and is also referred to herein as an upgraded storage controller OS relative to a second or existing version of the storage controller OS currently installed on the given storage system.

In step 202, one or more rules are generated for handling changes to respective ones of at least a subset of the set of components utilized in the first version of the storage controller OS. At least one of the generated rules may comprise (i) an identification of one or more of the subset of the components utilized in the first version of the storage controller OS affected by a designated change, (ii) a selected one of a set of supported upgrade procedures for applying the designated change, and (iii) one or more upgrade actions to be taken at least one of prior to and subsequent to applying the designated change. The set of supported upgrade procedures may include front-end upgrade procedures, non-interfering upgrade procedures, and finalization upgrade procedures.

The front-end upgrade procedure is used for upgrading components associated with front-end connectivity of the given storage system to one or more host devices providing IO requests to the given storage system. The front-end upgrade procedure may comprise disconnecting the given storage system from the one or more host devices while maintaining processing for handling IO requests directed to the plurality of storage devices of the given storage system. The given storage system may be part of a clustered storage system comprising at least one additional storage system, and maintaining processing for handling IO requests directed to the plurality of storage devices of the given storage system may comprise receiving and handling IO requests received from said at least one additional storage system while the given storage system is disconnected from the one or more host devices.

The non-interfering upgrade procedure is used for upgrading components associated with non-interfering processes distinct from processes utilized in receiving and handling IO requests directed to the plurality of storage devices of the given storage system. When the given storage system is part of a clustered storage system, non-interfering processes may be further distinct from those utilized in cluster management processes. The non-interfering upgrade procedure may comprise stopping and restarting the one or more non-interfering processes.

The finalization upgrade procedure is used for tasks to be applied after successful completion of one or more other upgrade procedures.

Steps 200 and 202 may be performed once for each new or upgraded version of a storage controller OS. That upgraded version of the storage controller OS may then be installed on any desired number of storage controllers. It should be appreciated that steps 200 and 202 may, in some embodiments, be performed by an entity that is distinct from the storage systems whose storage controllers are to be upgraded to a new OS. The results of steps 200 and 202 (e.g., a list of components utilized in the upgraded version of the storage controller OS, as well as a set of rules for handling upgrades to at least a subset of such components) may be provided itself as a file or other component within an image of the upgraded storage controller OS.

The FIG. 2 process continues with step 204, extracting the set of components utilized in the first version of the storage controller OS to a designated partition of one of a plurality of storage devices of a given storage system on which the first version of the storage controller OS is to be installed. The designated partition may comprise a first partition on one of the plurality of storage devices of the given storage system, and the second version of the storage controller OS may be installed on a second partition on one of the plurality of storage devices of the given storage system different than the first partition. Step 204 may further include designating the first partition as a root partition for the given storage system after extracting the set of components utilized in the first version of the storage controller OS to the first partition. Applying changes may comprise copying components from the first partition to the second partition.

In step 206, one or more changes to be applied for installing the first version of the storage controller OS on the given storage system are identified. To do so, the content of the extracted set of components utilized in the first version of the storage controller OS is compared with content of components utilized in a second version of the storage controller OS currently installed on the given storage system. If, in step 206, any of the identified changes are not covered by at least one of the rules generated in step 202, the FIG. 2 process may reboot the given storage system from the first partition to install the first version of the storage controller OS.

The process continues with applying, utilizing a given one of the generated rules corresponding to a given one of the components utilized in the first version of the storage controller operating system, at least a given one of the identified changes in step 208 to upgrade the second version of the storage controller OS to the first version of the storage controller OS without rebooting the given storage system.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for upgrading a storage controller OS. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different storage controller OS upgrade processes for respective different storage controllers or for different storage systems within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 110 of storage systems 106 that are configured to control performance of one or more steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 110, as well as other system components, may be implemented at least in part using processing devices of such processing platforms. For example, in a distributed implementation of a given one of the storage controllers 110, respective distributed modules of such a storage controller can be implemented in respective containers running on respective ones of the processing devices of a processing platform.

Figure 3:
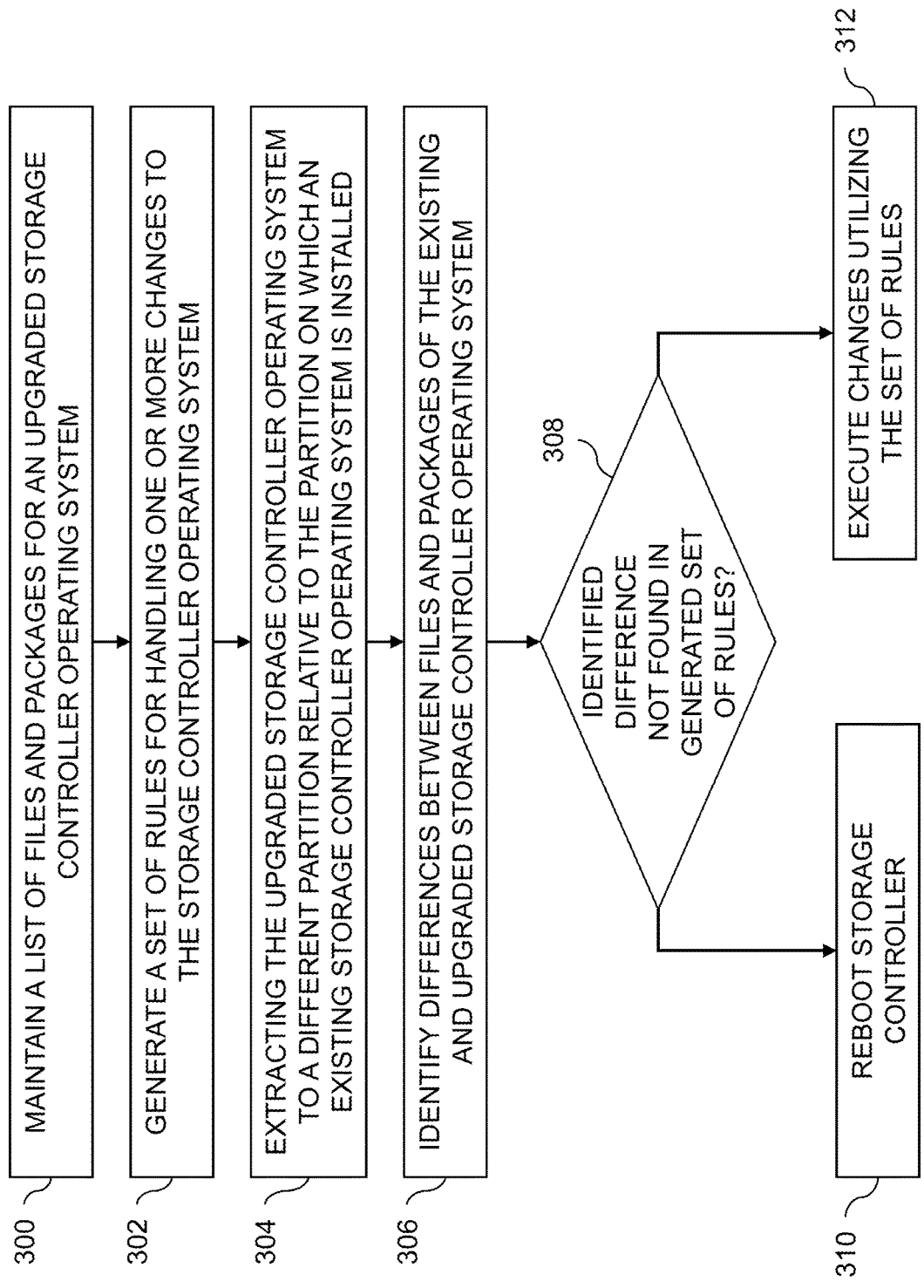
FIG. 3 is a flow diagram of another process for upgrading the operating system of storage controllers in a clustered storage system in an illustrative embodiment.

FIG. 3 shows a process for avoiding reboots during OS upgrades of storage controllers and reducing the performance penalty in a live clustered storage system. The FIG. 3 process is able to avoid reboots and reduce the performance penalty through identifying changes between a version of the storage controller OS that is currently installed and an upgraded version of the storage controller OS that is to be installed. The identified changes are then categorized into a number of predefined upgrade procedures or methods, and the changes are executed using such predefined upgrade procedures to upgrade the storage controller OS without rebooting the storage controller.

The FIG. 3 process begins with step 300, which occurs during a build process of the upgraded storage controller OS and includes maintaining a list of files and packages (e.g., RPM packages) in the upgraded storage controller OS. Step 300 may include maintaining, for each file or package in the list, a file or package version number or other identifier as well as a unique hash of that file or package. Such hashes may be used to compare files and packages of the upgraded storage controller OS with files and packages of an existing storage controller OS as described in further detail below with respect to step 306.

In step 302, a set of rules are generated for handling one or more changes to the storage controller OS. This may involve generating a file, table or other data structure with a set of rules and corresponding actions for handling changes in the files or packages of the upgraded storage controller OS that are in the list maintained in step 300. Each rule may include the file or package in the upgraded storage controller OS to which a given change applies, a categorization of the given change as corresponding to one of a designated set of predefined upgrade methods, and any optional pre- or post-upgrade actions to take before or after executing the given change. Such pre- and post-upgrade actions may be actions other than copying the new files for the upgraded storage controller OS, and may include actions such as restarting services of the storage controller OS, updating or re-initializing configuration files, etc.

The FIG. 3 process then proceeds to upgrade the storage controller OS on one or more storage controllers using steps 304 through 312. Steps 304 through 312 may be repeated for each storage controller that is to be upgraded with the upgraded storage controller OS. In step 304, the upgraded storage controller OS is extracted to a first partition of a given storage controller. The first partition is different than a second partition on which an existing version of the storage controller OS is installed for the given storage controller. After the upgraded storage controller OS is extracted to the first partition (e.g., a different partition relative to the existing storage controller OS), the first partition is marked as the new root partition for the given storage controller. This is done in case any issues are encountered during further processing below which necessitate reboot of the given storage controller. By marking the first partition as the new root partition, in the event of any such issue requiring reboot of the given storage controller, the given storage controller will reboot into or using the upgraded storage controller OS.

In illustrative embodiments, steps 304 through 312 are executed using a dedicated processor (e.g., a dedicated central processing unit (CPU) processor) that is not used for cluster management or IO handling processes for the given storage controller. Thus, the FIG. 3 process may be run without affecting the performance of the clustered storage system.

In step 306, the content of the files and packages of the current or existing storage controller OS and the new or upgraded storage controller OS are compared to identify differences between the different versions of the storage controller OS. The differences may be identified by generating and comparing hashes of the files and packages of the different versions of the storage controller OS. The identified differences correspond to the changes required for upgrading the storage controller OS. Each difference or change is then categorized (e.g., as one of added files and packages, removed files and packages, or modified files and packages).

In step 308, the differences identified in step 306 are compared against the set of rules generated in step 304 to determine whether any of the identified differences are not found in the set of rules. If the result of the step 308 determination is yes, this means that there is at least one difference or change that does not fall within one of the set of predefined upgrade categories that can be handled without rebooting the storage controller. The FIG. 3 process then proceeds to step 310, where the storage controller is rebooted into the new root partition designated in step 304 as described above to handle such unknown upgrade categories. The unknown upgrade categories may include, by way of example, kernel module changes for a Linux operating system, which cannot be handled without rebooting the storage controller. This is contrast with the various predefined upgrade categories corresponding to upgrade methods that may be executed without rebooting the storage controller.

If the result of the step 308 determination is no, all differences or changes fall within one of the set of predefined upgrade categories that can be handled without rebooting the storage controller. The FIG. 3 process then proceeds to step 312, where the changes are executed utilizing the set of rules generated in step 302 to upgrade the storage controller OS without requiring reboot of the storage controller OS.

As discussed above, changes to the storage controller OS may be characterized as corresponding to one of a set of predefined upgrade methods. In some embodiments, the predefined upgrade methods include methods for: (1) front-end modules; (2) non-interfering modules; and (3) finalization actions. Front-end modules and non-interfering modules may represent the majority or all of the changes required for upgrading the storage controller OS. Thus, for most storage controller OS upgrades, reboot may be avoided using the techniques described herein. For certain types of upgrades, such as upgrades or changes to the kernel of a Linux OS, reboot may be required. Such changes are handled as described above with respect to steps 308 and 310 of the FIG. 3 process.

Front-end modules provide front-end connectivity functionality in the storage controller OS, enabling host devices to pass IO requests to the nodes or storage servers in the clustered storage system. Such front-end connectivity may include support for various types of communication, including Fibre Channel, InfiniBand, Fibre Channel over Ethernet (FCoE), SCSI, Internet SCSI (iSCSI), etc. Examples of front-end modules include Enterprise Storage OS (ESOS), SCST modules, Emulux OneCore™ Storage (OCS) modules, etc. The predefined upgrade method for front-end modules includes disconnecting a given node or storage server in a clustered storage system from clients or host devices while other nodes or storage servers in the clustered storage system are connected to the clients or host devices. During the disconnection, processing for handling IO requests is still active on the given node, and may be used for handling IO requests that were received at other ones of the nodes in a clustered storage system that are sent to the given node. As the clustered storage system may handle IO requests in a distributed manner, the back-end computing power of the given node is not wasted and performance is not degraded.

Further, through disconnection of the front-end modules while the back-end processes for handling IO requests are not restarted, there is no need for a proactive "metadata" load operation (e.g., to load various mapping tables as described in further detail below) to be performed to bring the given node back up as would be required after a reboot of the node. A clustered storage system, for example, may be a content addressable storage system that utilizes address metadata to provide content addressable storage functionality. The address metadata in some embodiments comprises at least a portion of one or more logical layer mapping tables that map logical addresses of respective ones of the data pages of the storage volume to corresponding content-based signatures of the respective data pages.

Such content-based signatures may comprise respective hash digests of respective data pages. A given one of the hash digests is generated in illustrative embodiments by applying a secure hashing algorithm to content of a corresponding one of the data pages. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

Non-interfering modules provide various functionality for external services that do not affect handling of IO requests. Examples of non-interfering modules include modules for time zone packages and other aspects of the storage controller OS that are not needed to handle IO requests or cluster management processing. The predefined upgrade method for non-interfering modules includes stopping and restarting associated services in the storage controller OS. As the non-interfering modules are assumed to provide functionality that does not affect IO request handling and cluster management processes in the clustered storage system, performance is not degraded.

Finalization actions represent actions that are taken after other flows finish successfully to complete the storage controller OS upgrade. Once such other flows are completed, the finalization actions may be performed. Examples of finalization actions include changing the version number of the storage controller OS, signing the current OS file system with the new OS version string, etc.

To implement the predefined upgrade methods, such as for front-end modules and non-interfering modules, step 312 may include a system manager (SYM) process on the storage controller executing the predefined upgrade methods for the various front-end and non-interfering modules subject to a change in the upgraded storage controller OS one after another on each storage controller sequentially. Any file or package change that remains under the category which does not require reboot is copied from the first partition (e.g., the partition to which the upgraded storage controller OS is extracted in step 304) to the second partition (e.g., the partition that has the existing storage controller OS installed). Any necessary pre- or post-upgrade actions identified in the set of rules for that change are performed as needed to ensure that no active processes are affected by the changes.

Using the techniques described above, illustrative embodiments are able to define ad-hoc rules for any changes to a storage controller OS, in the same version where the OS changes are applied. The rules generated in step 302 may be included as a file in an image of the new or upgraded storage controller OS. Thus, there is no need to add rules. Further, the rules file included in the image of the upgraded storage controller OS may be kept relatively small.

In some embodiments, the clustered storage system comprises an XtremIO™ storage array or other type of content addressable storage system suitably modified to incorporate storage controller OS upgrade functionality as disclosed herein.

An illustrative embodiment of such a content addressable storage system will now be described with reference to FIG.

4. In this embodiment, a content addressable storage system 406 comprises a plurality of storage devices 408 and an associated storage controller 410. The content addressable storage system 406 may be viewed as a particular implementation of at least one of the storage systems 106, and accordingly is assumed to be coupled to other ones of the storage systems 106 and to one or more host devices 102 within information processing system 100.

The storage controller 410 in the present embodiment is configured to implement storage controller OS upgrade functionality of the type previously described in conjunction with FIGS. 1 through 3. The storage controller 410 includes distributed modules 412 and 414, which are configured to operate in a manner similar to that described above for respective corresponding upgrade change identification module 112 and upgrade change execution module 114 of the storage controllers 110 of system 100.

Figure 4:
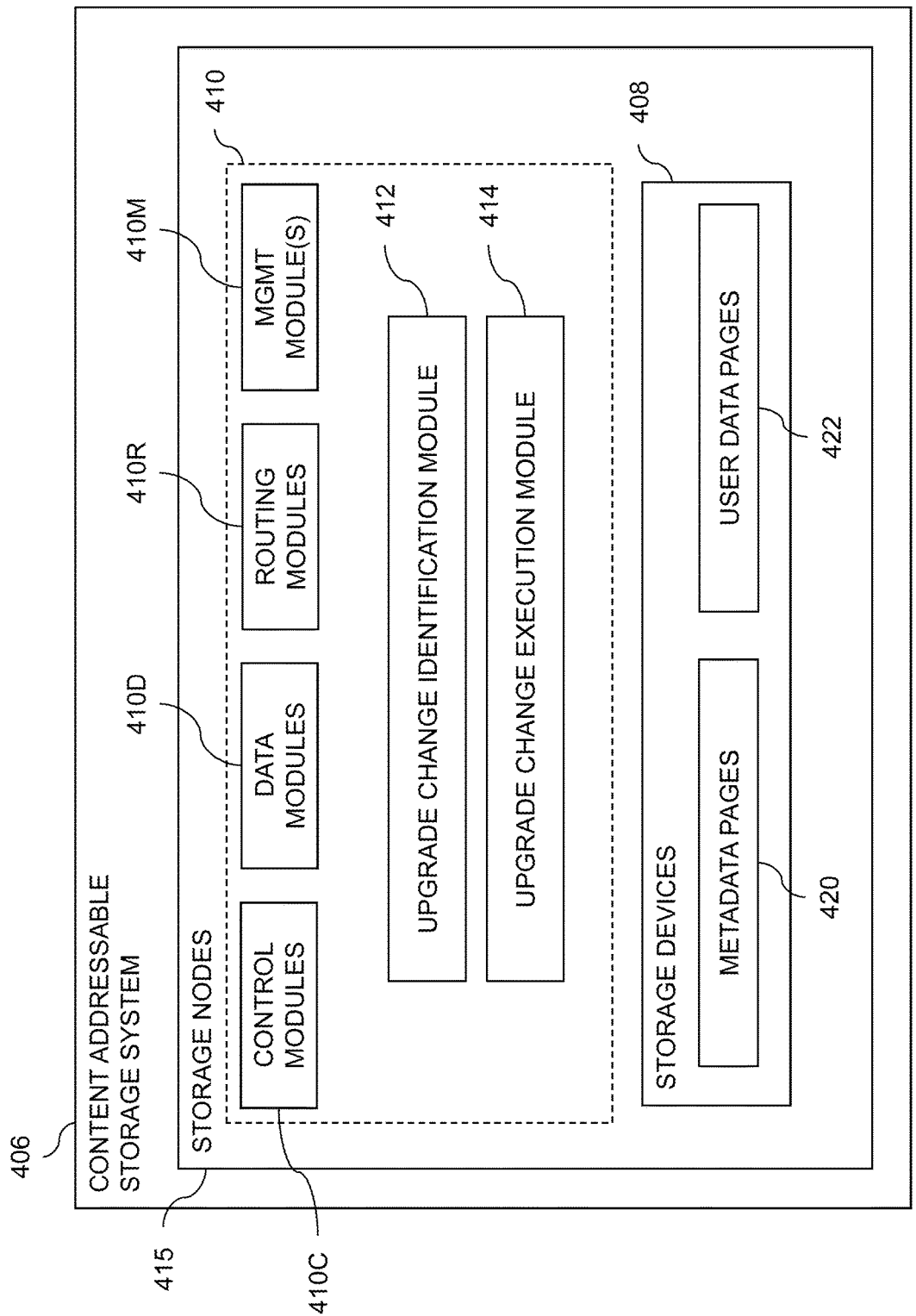
FIG. 4 shows a content addressable storage system having a distributed storage controller configured with functionality for fast upgrade of the operating system of the distributed storage controller in an illustrative embodiment.

The content addressable storage system 406 in the FIG. 4 embodiment is implemented as at least a portion of a clustered storage system and includes a plurality of storage nodes 415 each comprising a corresponding subset of the storage devices 408. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 406 is assumed to be implemented using at least one processing device comprising a processor coupled to a memory.

The storage controller 410 of the content addressable storage system 406 is implemented in a distributed manner so as to comprise a plurality of distributed storage controller components implemented on respective ones of the storage nodes 415. The storage controller 410 is therefore an example of what is more generally referred to herein as a "distributed storage controller." In subsequent description herein, the storage controller 410 is referred to as distributed storage controller 410.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 410 of the content addressable storage system 406.

The modules of the distributed storage controller 410 in the present embodiment more particularly comprise different sets of processing modules implemented on each of the storage nodes 415. The set of processing modules of each of the storage nodes 415 comprises at least a control module 410C, a data module 410D and a routing module 410R. The distributed storage controller 410 further comprises one or more management ("MGMT") modules 410M. For example, only a single one of the storage nodes 415 may include a management module 410M. It is also possible that management modules 410M may be implemented on each of at least a subset of the storage nodes 415. A given set of processing modules implemented on a particular one of the storage nodes 415 therefore illustratively includes at least one control module 410C, at least one data module 410D and at least one routing module 410R, and possibly a management module 410M.

Communication links may be established between the various processing modules of the distributed storage controller 410 using well-known communication protocols such as IP, Transmission Control Protocol (TCP), and remote direct memory access (RDMA). For example, respective sets of IP links used in data transfer and corresponding messaging could be associated with respective different ones of the routing modules 410R.

Although shown as separate modules of the distributed storage controller 410, the modules 412 and 414 in the present embodiment are assumed to be distributed at least in part over at least a subset of the other modules 410C, 410D, 410R and 410M of the storage controller 410. Accordingly, at least portions of the storage controller OS upgrade functionality of the modules 412 and 414 may be implemented in one or more of the other modules of the storage controller 410. In other embodiments, the modules 412 and 414 may be implemented as stand-alone modules of the storage controller 410.

The storage devices 408 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 408. Accordingly, metadata pages 420 and user data pages 422 may be viewed as corresponding to respective designated metadata and user data areas of the storage devices 408.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 406. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 408.

The content addressable storage system 406 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 406 is illustratively stored as metadata pages 420 in the metadata area. The generation and storage of the hash metadata is assumed to be performed under the control of the storage controller 410.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 408.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 406 is illustratively distributed among the control modules 410C.

The storage controller OS upgrade functionality provided by modules 412 and 414 in this embodiment is assumed to be distributed across multiple distributed processing modules, including at least a subset of the processing modules 410C, 410D, 410R and 410M of the distributed storage controller 410.

In some embodiments, the content addressable storage system 406 comprises an XtremIO™ storage array suitably modified to incorporate storage controller OS upgrade functionality as disclosed herein.

In arrangements of this type, the control modules 410C, data modules 410D and routing modules 410R of the distributed storage controller 410 illustratively comprise respective C-modules, D-modules and R-modules of the XtremIO™ storage array. The one or more management modules 410M of the distributed storage controller 410 in such arrangements illustratively comprise a system-wide management module ("SYM module") of the XtremIO™ storage array, although other types and arrangements of system-wide management modules can be used in other embodiments. Accordingly, storage controller OS upgrade functionality in some embodiments is implemented under the control of at least one system-wide management module of the distributed storage controller 410, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 410C such that control of the slices within the storage controller 410 of the storage system 406 is substantially evenly distributed over the control modules 410C of the storage controller 410.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 406 each illustratively comprise one or more IO operations directing that at least one data item of the storage system 406 be written to in a particular manner. A given write request is illustratively received in the storage system 406 from a host device over a network. In some embodiments, a write request is received in the distributed storage controller 410 of the storage system 406, and directed from one processing module to another processing module of the distributed storage controller 410. For example, a received write request may be directed from a routing module 410R of the distributed storage controller 410 to a particular control module 410C of the distributed storage controller 410. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 406 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 406 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 406. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 408. This is also referred to as physical layer mapping.

For a given write request, hash metadata comprising at least a subset of the above-noted tables is updated in conjunction with the processing of that write request.

The A2H, H2D, and HMD tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 406. It should be noted that additional or alternative metadata structures can be used in other embodiments. References herein to particular tables of particular types, such as A2H, H2D, and HMD tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 406 correspond to respective physical blocks of a physical layer of the storage system 406 The user data pages of the logical layer are organized by LBA and have reference via respective content-based signatures to particular physical blocks of the physical layer.

Each of the physical blocks has an associated reference count that is maintained within the storage system 406. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 410C, 410D, 410R and 410M as shown in the FIG. 4 embodiment is presented by way of example only. Numerous alternative arrangements of processing modules of a distributed storage controller may be used to implement storage controller OS upgrade functionality in a clustered storage system in other embodiments.

Additional examples of content addressable storage functionality implemented in some embodiments by control modules 410C, data modules 410D, routing modules 410R and management module(s) 410M of distributed storage controller 410 can be found in U.S. Pat. No. 9,104,326, entitled "Scalable Block Data Storage Using Content Addressing," which is incorporated by reference herein.

Alternative arrangements of these and other storage node processing modules of a distributed storage controller in a content addressable storage system can be used in other embodiments.

Illustrative embodiments of a storage system with storage controller OS upgrade functionality as disclosed herein can provide a number of significant advantages relative to conventional arrangements. For example, some embodiments advantageously provide improved storage system performance by reducing or eliminating reboots required to update the storage controller OS. Some embodiments further reduce the length of time in which a clustered storage system experiences degraded performance due to reboots of nodes within the clustered storage system. Still further, embodiments can avoid a computationally expensive and time-consuming metadata load operation that is required after rebooting nodes in the clustered storage system.

In some embodiments, the storage systems are illustratively implemented as respective content addressable storage systems, but in other embodiments one or more of the storage systems can instead be a traditional storage array, which does not support any type of content addressable storage functionality.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with storage controller OS upgrade functionality will now be described in greater detail with reference to FIGS. 5 and 6. Although described in the context of system 100, these platforms may also be used to implement at least portions of other information processing systems in other embodiments.

Figure 5:
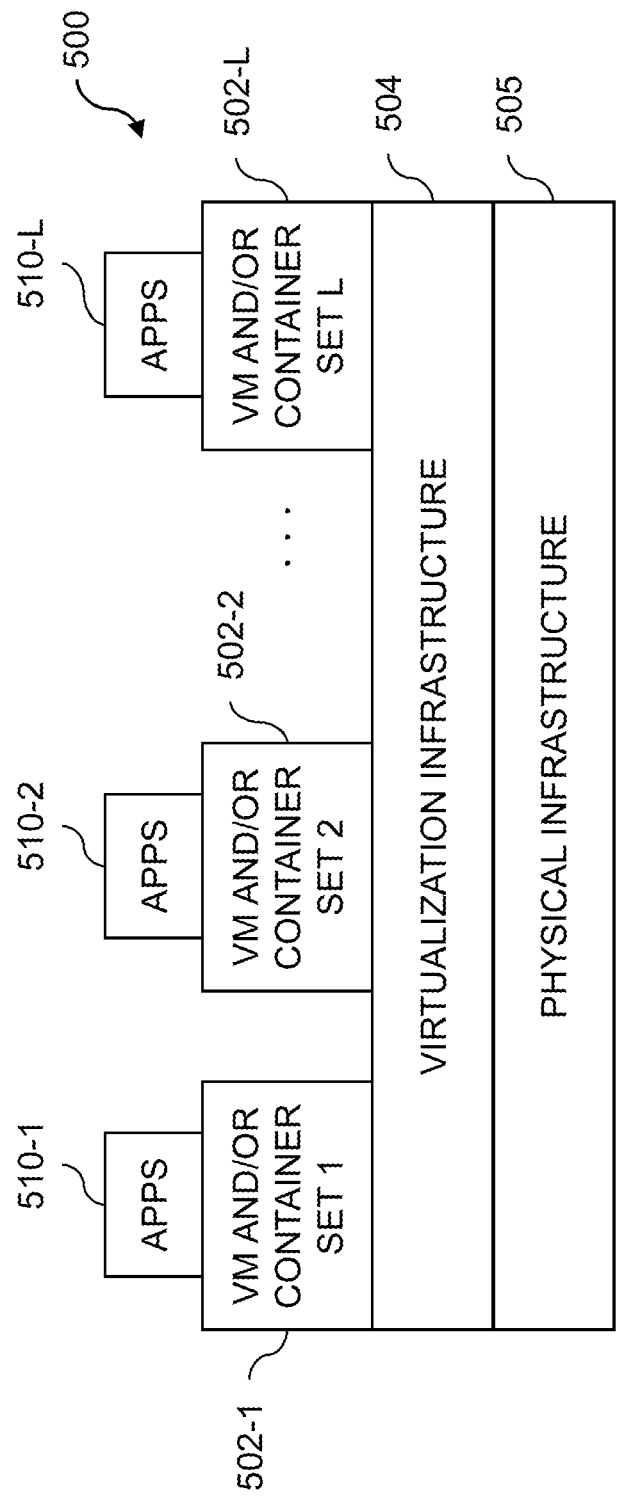
FIGS. 5 and 6 show examples of processing platforms that may be utilized to implement at least a portion of an information processing system in illustrative embodiments.
Figure 6:
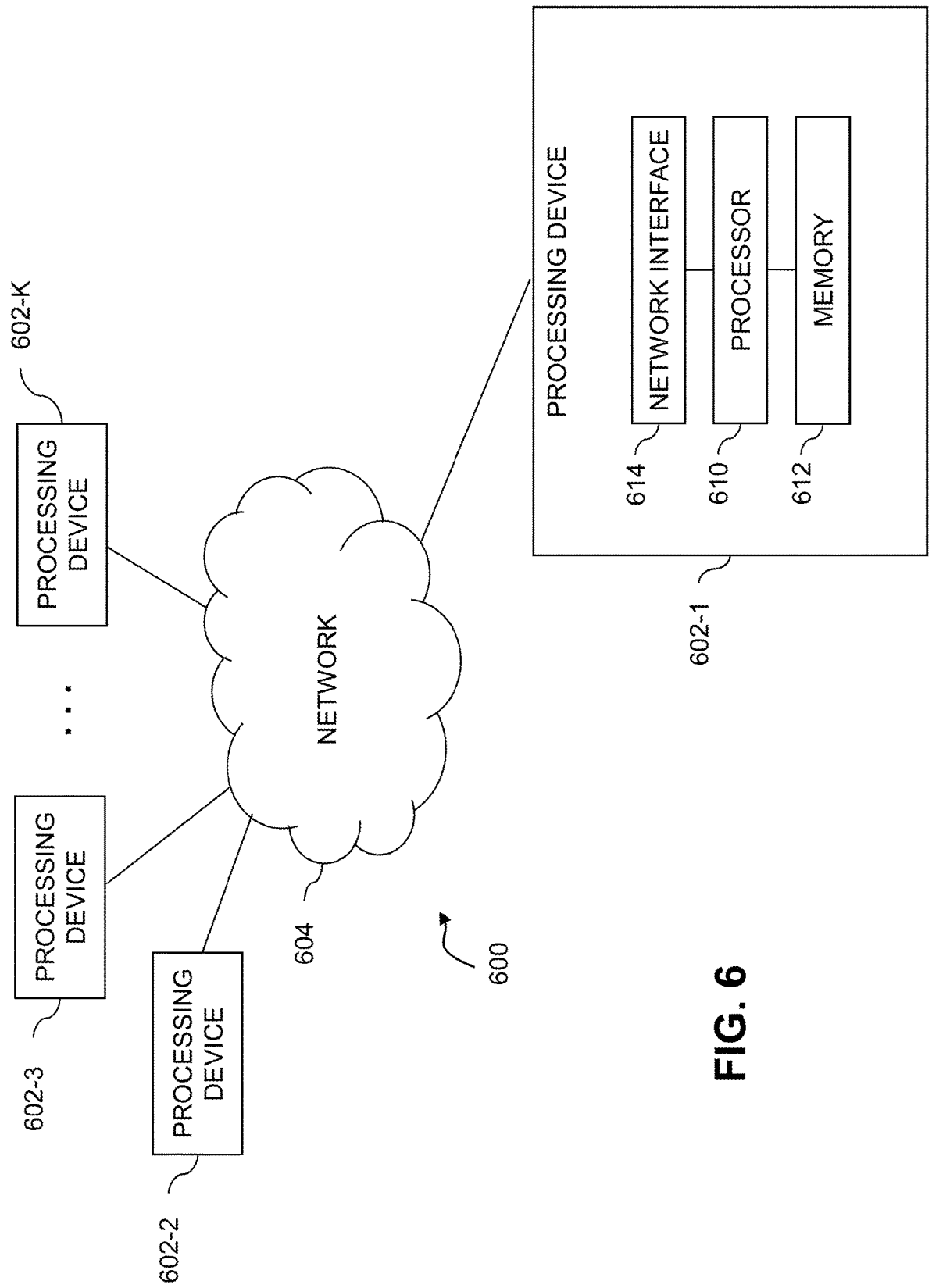

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide storage controller OS upgrade functionality of the type described above for one or more processes running on a given one of the VMs. For example, each of the VMs can implement logic for supporting storage controller OS upgrade functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide storage controller OS upgrade functionality of the type described above. For example, a container host device supporting multiple containers of one or more container sets can implement one or more instances of logic for supporting storage controller OS upgrade functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage controller OS upgrade functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, and storage controllers. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
      to extract a set of components utilized in a first version of a storage controller operating system to a designated partition of one of a plurality of storage devices of a given storage system on which the first version of the storage controller operating system is to be installed;
      to identify one or more changes to be applied for installing the first version of the storage controller operating system on the given storage system by comparing content of the extracted set of components utilized in the first version of the storage controller operating system with content of components utilized in a second version of the storage controller operating system currently installed on the given storage system; and
      to apply, utilizing at least one rule corresponding to a given one of the components utilized in both the first version of the storage controller operating system and the second version of the storage controller operating system, at least a given one of the identified changes to the given component to upgrade the second version of the storage controller operating system to the first version of the storage controller operating system;
   wherein the given component provides front-end connectivity to one or more host devices providing input-output requests directed to the plurality of storage devices of the given storage system; and
   wherein applying the given identified change to the given component comprises at least temporarily disabling front-end connectivity of the given storage system to the one or more host devices while maintaining back-end processing for handling the input-output requests directed to the plurality of storage devices of the given storage system.

2. The apparatus of claim 1 wherein said at least one processing device comprises a dedicated central processing unit of the given storage system distinct from one or more additional central processing units responsible for handling input-output processing by the given storage system.

3. The apparatus of claim 2 wherein the given storage system is part of a clustered storage system comprising a plurality of storage nodes, and wherein the dedicated central processing unit of the given storage system is further distinct from one or more additional central processing units responsible for cluster management in the clustered storage system.

4. The apparatus of claim 1 wherein said at least one rule comprises:
   an identification of one or more of the subset of the components utilized in the first version of the storage controller operating system affected by a designated change;
   a selected one of a set of supported upgrade procedures for applying the designated change; and
   one or more upgrade actions to be taken at least one of prior to and subsequent to applying the designated change.

5. The apparatus of claim 4 wherein the set of supported upgrade procedures comprises a front-end upgrade procedure for upgrading components associated with front-end connectivity of the given storage system to the one or more host devices providing the input-output requests directed to the plurality of storage devices of the given storage system, and wherein the front-end upgrade procedure comprises disconnecting the given storage system from the one or more host devices.

6. The apparatus of claim 1 wherein the given storage system is a part of a clustered storage system comprising at least one additional storage system, and wherein maintaining processing for handling the input-output requests directed to the plurality of storage devices of the given storage system comprises receiving and handling input-output requests received from said at least one additional storage system while the given storage system is disconnected from the one or more host devices.

7. The apparatus of claim 4 wherein the set of supported upgrade procedures comprises a non-interfering upgrade procedure for upgrading one or more components associated with one or more non-interfering processes distinct from processes utilized in receiving and handling input-output requests directed to the plurality of storage devices of the given storage system, and wherein the non-interfering upgrade procedure comprises stopping and restarting the one or more non-interfering processes.

8. The apparatus of claim 4 wherein the set of supported upgrade procedures comprises a finalization upgrade procedure for tasks to be applied after successful completion of one or more other upgrade procedures.

9. The apparatus of claim 4 wherein the set of supported upgrade procedures provide processes for upgrading one or more of the components without requiring reboot of the given storage system.

10. The apparatus of claim 1 wherein said at least one processing device is further configured:
to analyze the first version of the storage controller operating system to determine the set of components utilized in the first version of the storage controller operating system; and
to generate one or more rules for handling changes to respective ones of at least a subset of the set of components utilized in the first version of the storage controller operating system.

11. The apparatus of claim 1 wherein the designated partition comprises a first partition on one of the plurality of storage devices of the given storage system, and wherein the second version of the storage controller operating system is installed on a second partition on one of the plurality of storage devices of the given storage system different than the first partition.

12. The apparatus of claim 11 wherein applying the given identified change comprises copying a given file or package from the first partition to the second partition.

13. The apparatus of claim 11 wherein said at least one processing device is further configured to designate the first partition as a root partition for the given storage system responsive to extracting the set of components utilized in the first version of the storage controller operating system to the first partition.

14. The apparatus of claim 11 wherein said at least one processing device is further configured, response to identifying at least one change to be applied for installing the first version of the storage controller operating system on the given storage system not covered by at least one of the generated rules, rebooting the given storage system from the first partition to install the first version of the storage controller operating system.

15. A method comprising:
extracting a set of components utilized in a first version of a storage controller operating system to a designated partition of one of a plurality of storage devices of a given storage system on which the first version of the storage controller operating system is to be installed;
identifying one or more changes to be applied for installing the first version of the storage controller operating system on the given storage system by comparing content of the extracted set of components utilized in the first version of the storage controller operating system with content of components utilized in a second version of the storage controller operating system currently installed on the given storage system; and
applying, utilizing at least one rule corresponding to a given one of the components utilized in both the first version of the storage controller operating system and the second version of the storage controller operating system, at least a given one of the identified changes to the given component to upgrade the second version of the storage controller operating system to the first version of the storage controller operating system;
wherein the given component provides front-end connectivity to one or more host devices providing input-output requests directed to the plurality of storage devices of the given storage system;
wherein applying the given identified change to the given component comprises at least temporarily disabling front-end connectivity of the given storage system to the one or more host devices while maintaining back-end processing for handling the input-output requests directed to the plurality of storage devices of the given storage system; and
wherein the method is implemented by at least one processing device comprising a processor coupled to a memory.

16. The method of claim 15 wherein said at least one rule comprises:
an identification of one or more of the subset of the components utilized in the first version of the storage controller operating system affected by a designated change;
a selected one of a set of supported upgrade procedures for applying the designated change; and
one or more upgrade actions to be taken at least one of prior to and subsequent to applying the designated change.

17. The method of claim 16 wherein the set of supported upgrade procedures comprises a front-end upgrade procedure for upgrading components associated with front-end connectivity of the given storage system to the one or more host devices providing the input-output requests directed to the plurality of storage devices of the given storage system, and wherein the front-end upgrade procedure comprises disconnecting the given storage system from the one or more host devices.

18. A computer program product comprising a non-transitory processor-readable storage medium having stored therein program code of one or more software programs, wherein the program code when executed by at least one processing device causes said at least one processing device:
to extract a set of components utilized in a first version of a storage controller operating system to a designated partition of one of a plurality of storage devices of a given storage system on which the first version of the storage controller operating system is to be installed;
to identify one or more changes to be applied for installing the first version of the storage controller operating system on the given storage system by comparing content of the extracted set of components utilized in the first version of the storage controller operating system with content of components utilized in a second version of the storage controller operating system currently installed on the given storage system; and
to apply, utilizing at least one rule corresponding to a given one of the components utilized in both the first version of the storage controller operating system and the second version of the storage controller operating system, at least a given one of the identified changes to the given component to upgrade the second version of the storage controller operating system to the first version of the storage controller operating system;

wherein the given component provides front-end connectivity to one or more host devices providing input-output requests directed to the plurality of storage devices of the given storage system; and wherein applying the given identified change to the given component comprises at least temporarily disabling front-end connectivity of the given storage system to the one or more host devices while maintaining back-end processing for handling the input-output requests directed to the plurality of storage devices of the given storage system.

19. The computer program product of claim 18 wherein said at least one rule comprises:

an identification of one or more of the subset of the components utilized in the first version of the storage controller operating system affected by a designated change;

a selected one of a set of supported upgrade procedures for applying the designated change; and one or more upgrade actions to be taken at least one of prior to and subsequent to applying the designated change.

20. The computer program product of claim 19 wherein the set of supported upgrade procedures comprises a front-end upgrade procedure for upgrading components associated with front-end connectivity of the given storage system to the one or more host devices providing the input-output requests directed to the plurality of storage devices of the given storage system, and wherein the front-end upgrade procedure comprises disconnecting the given storage system from the one or more host devices.

\* \* \* \* \*